Sept. 18, 1923.
E. W. K. ROE
SAW
Filed Dec. 12, 1921
1,468,514
2 Sheets-Sheet 2
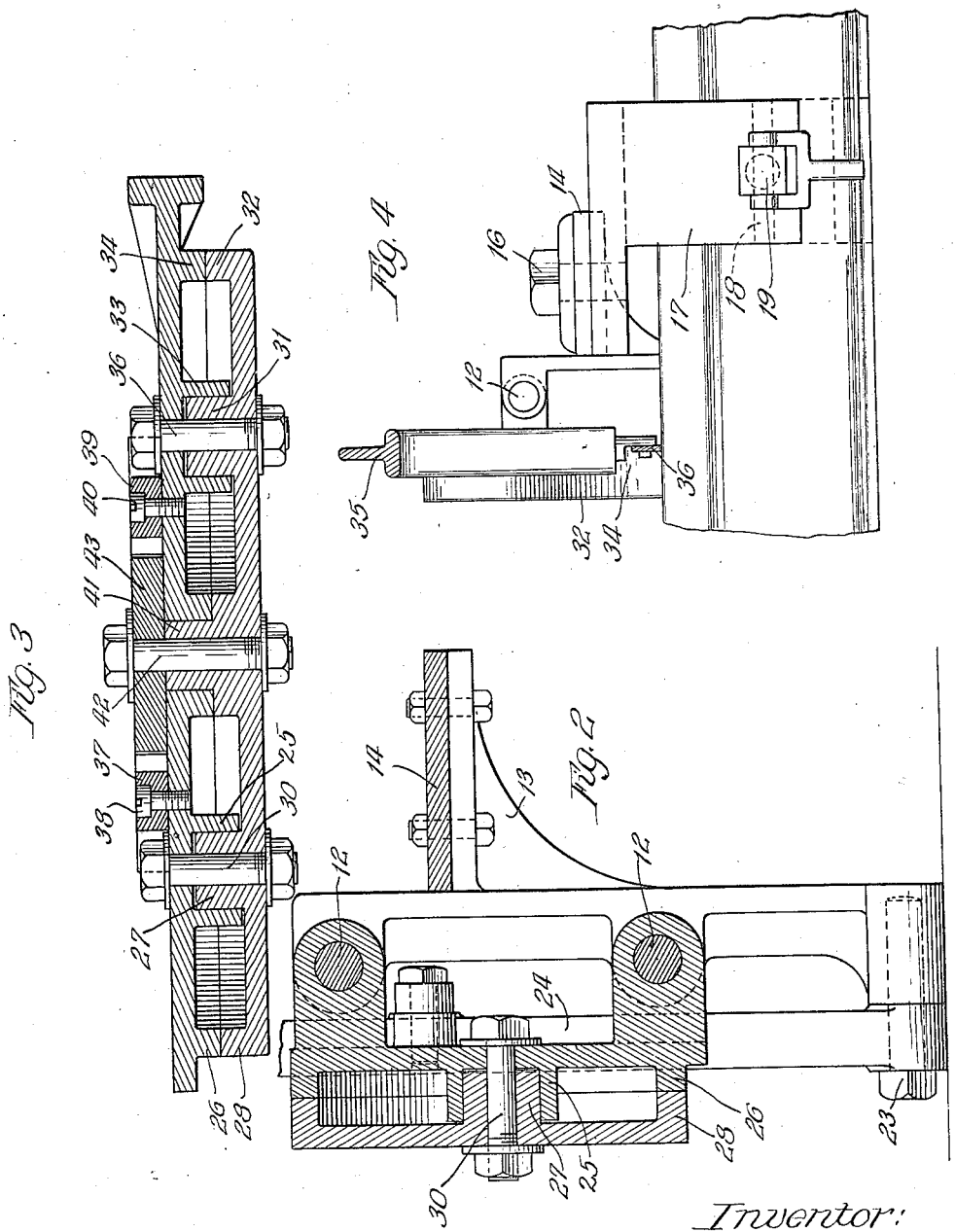

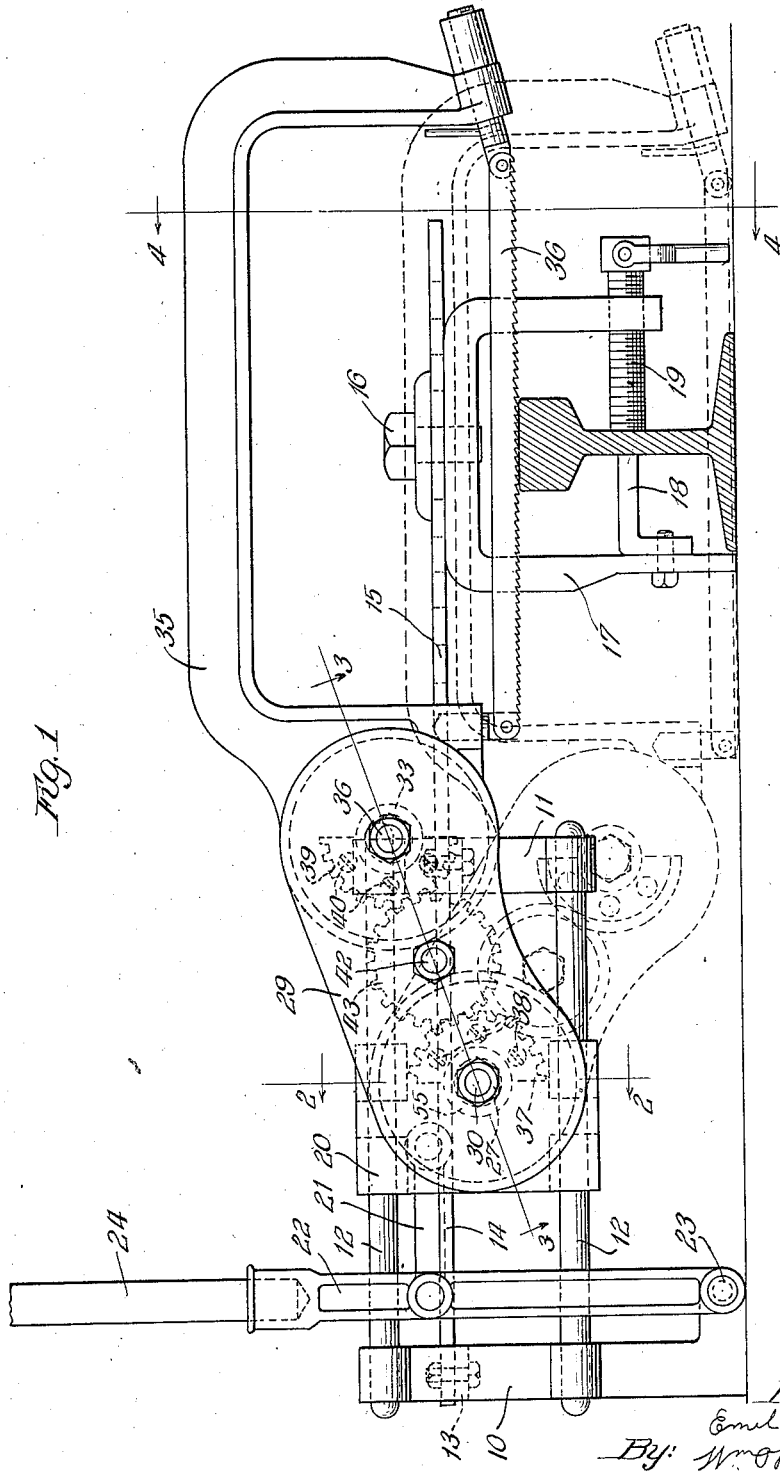

Patented Sept. 18, 1923.

1,468,514

UNITED STATES PATENT OFFICE.

EMIL W. K. ROE, OF CHICAGO, ILLINOIS, ASSIGNOR TO THE ALDON COMPANY, OF CHICAGO, ILLINOIS, A CORPORATION OF ILLINOIS.

SAW.

Application filed December 12, 1921. Serial No. 521,615.

*To all whom it may concern:*

Be it known that I, EMIL W. K. ROE, a citizen of the United States, residing at Chicago, in the county of Cook and State of Illinois, have invented certain new and useful Improvements in Saws, of which the following is a specification.

My invention relates to saws and has for its principal object to prevent lateral and longitudinal inclination of the blade with respect to the work.

Another object of the invention is to so direct the blade that it will proceed through the cut along straight lines and the edge will feed equally at both ends.

Further objects of the invention will become apparent as the description is read in connection with the accompanying drawing showing a selected embodiment of the invention in which Fig. 1 is a side elevation showing as much as is necessary to give a clear understanding of the application of the invention to a hack saw for cutting rails and the like;

Figs. 2, 3, and 4 are transverse sections on the lines 2—2, 3—3 and 4—4 respectively of Fig. 1.

This embodiment of the invention includes a suitable frame or support carrying the upright members 10 and 11 connected by the guide rods 12. Each of the uprights 10 and 11 is provided with a suitable bracket 13 to which is secured a horizontal frame member 14 extending to the right in Fig. 1 and provided with a plurality of perforations 15 adapted to receive a bolt 16 by which the work clamp 17 may be secured in the desired position with respect to the saw. As illustrated, this clamp consists of a U-shaped yoke having a fixed jaw 18 aligned with the screw 19. This construction is particularly suitable for holding rails, but it will be understood that any suitable form of clamp may be used.

A cross head 20 is slidably mounted on the guide rods 12 and connected by a link 21 to an operating lever 22 pivoted at 23 to the upright 10 or any suitable fixed support, and equipped with the handle 24. The front face of the cross head 20 is provided with two concentric flanges 25 and 26 adapted to co-operate with similar flanges 27 and 28 on one end of a link 29. The flange 27 is adapted to be received within the flange 25 as illustrated in Fig. 2, and flange 28 is of substantially the same diameter and area as the flange 26, so as to form a proper bearing therewith, as is also indicated in Fig. 2.

A bolt 30 passing through the cross-head and the link and concentric with the annular flanges serves to secure the flanges 26 and 28 against separation. The opposite end of the link 29 is equipped with annular flanges 31 and 32 corresponding in all respects to the flanges 27 and 28 which co-operate in like manner with flanges 33 and 34 on one end of a saw frame 35. A bolt 36 passes through the link and the saw frame at the center of the annular flanges and secures the parts against separation. The saw frame 35 may be of any suitable construction and may have any desired means for securing a blade 36 therein.

It is not intended that the bolts 30 and 36 shall serve as pivots, but that the complementary flanges 25 and 27, and 31 and 33 shall form the pivotal bearings, the bolts 30 and 36 being relied upon merely to hold the flanges 26 and 28, and 32 and 34 in close contact. These larger flanges serve to prevent any lateral or inclined movement of the saw frame with respect to the cross head. Of course, substantially the same results can be obtained by making the annular bearings in the form of discs rather than flanges, but the bearing area presented by the flanges here disclosed is sufficient to endure the wear and permits the use of less metal.

The cross head 20 is provided on its rear side with a segment 37 of a gear secured thereto by screws 38, or in any other manner, and the saw frame 35 is equipped with a similar segment 39 secured thereto by screws 40. These segments are of the same size and have the same number of similar teeth. The link 29 is provided adjacent to its center with a boss 41 forming a bearing for the pintle 42 on which is mounted a gear 43 meshing with the segments 37 and 39. The boss 41 may be extended to form the bearing for the gear 43 if desired, or the gear may be journaled in any other suitable manner.

The broad bearings in the pivotal connections between the link and the cross head and saw frame effectually hold the saw frame upright, prevent lateral movement of the blade, and direct it in straight lines as it proceeds through the work, while the gear 43 and the segments 37 and 39 constrain the blade 36 to move through successive parallel positions as it proceeds through the cut. As the saw frame descends from the solid line position in Fig. 1 towards the dotted line position, the link 29 rotates about the axis of the bolt 30 causing the gear 43 to rotate clock-wise in Fig. 1, which compensates for the rotation of the link 29 and maintains the saw frame 35 and consequently the blade parallel to its original position.

With this construction positive feeding mechanism will not ordinarily be needed as the engagement of the saw teeth with the work on the cutting stroke will cause the blade to be fed into the work automatically. I have also found that the blade moves easily on the return stroke without binding or dragging.

I am aware that changes in the form and proportion of parts, and in the details of construction of my invention may be made without departing from the spirit or sacrificing any of the advantages thereof, and I reserve the right to make all such changes as fairly fall within the scope of the following claims.

I claim:

1. The combination of a saw, means pivotally connected to the saw at a single point for supporting the saw in operative position and permitting it to feed through the work by a rotary movement, the saw feeding equally throughout its entire length and means for causing said saw to feed through a series of parallel positions.

2. The combination of a saw, rotatable means for directing said saw, and means for causing said saw to feed equally throughout its length, said several means being operatively connected to said saw through a single common pivotal axis.

3. The combination of a saw, means for directing said saw including an element pivoted thereto and adapted to rotate about a reciprocating axis constrained to move in a path substantially parallel to the path in which the saw reciprocates, and means to cause said saw to feed equally at all points in its length..

4. The combination of a saw, reciprocating means pivotally connected with said saw, means for guiding said reciprocating means in a straight line, and means to maintain said saw substantially parallel to said guiding means.

5. The combination of a reciprocating cross head, means for reciprocating said cross head, means for guiding said cross head, a saw, an element adapted to rotate relative to said cross head and pivoted to said saw, and means for constraining said saw to feed equally throughout its length.

6. The combination of a saw, directing means for said saw adapted to rotate about a reciprocating axis, an element fixed with respect to said axis, an element fixed with respect to said saw, and gearing between said elements adapted to constrain said saw to feed equally at all points in its length.

7. The combination of a reciprocating cross head, a saw having a blade, a link pivotally connected with said cross head and said saw, and gearing between said cross head and said saw adapted to constrain said blade to feed equally in all points in its length.

8. The combination of a reciprocating cross head, a saw having a blade, a link pivoted to both said cross head and said saw, a gear fixed to said cross head, a gear fixed to said saw, and a gear moving with said link and meshing with said fixed gear.

9. The combination of a cross head, a saw, a link pivotally connected to both said cross head and said saw, the connections between said link and said cross head and said link and said saw embodying broad circular bearings to prevent lateral movement of said saw relative to said cross head, the radii of said bearings on the link approximately equaling the distance between the pivotal centers of the link.

10. The combination of a cross head, a saw, a link pivotally connected to both said cross head and said saw, the pivotal connections embodying auxiliary bearing surfaces distant from the pivotal axis so as to prevent lateral movement of said saw relative to said cross head, the link being adapted to contact said bearing surfaces.

11. The combination of a cross head having a broad bearing surface thereon, a saw having a broad bearing surface thereon, a link pivotally connected to both said cross head and said saw and having corresponding broad bearing surfaces co-operating with the bearing surfaces on said cross head and said saw to prevent relative lateral movement thereof, the bearing surfaces on the link being approximately as broad as the distance between the pivotal centers of the link will permit.

12. The combination of a cross head having annular bearing surfaces, a saw having annular bearing surfaces, and a link pivotally connected to the cross head and the saw having annular bearing surfaces complemental to the bearing surfaces on said cross head and said saw and co-operating therewith to prevent relative lateral movement of said cross head and said saw, said annular bearings being concentric with the pivotal centers of the link.

13. The combination of a cross head, a saw, a link pivotally connected to said cross head and said saw, the pivotal connections embodying broad bearing surfaces adapted to prevent relative lateral movement of said cross head and said saw, a gear fixed with respect to said cross head, a gear fixed with respect to said saw, and a gear carried by said link and meshing with said fixed gears.

14. The combination of a reciprocating cross head, a saw having a blade, a link pivotally connected with said cross head and said saw, and means including a member rotatably mounted upon the link for constraining said blade to feed equally at all points in its length.

EMIL W. K. ROE.